(12) United States Patent
Farley et al.

(10) Patent No.: US 9,686,713 B2
(45) Date of Patent: *Jun. 20, 2017

(54) APPLICATION SPECIFIC TRAFFIC OPTIMIZATION IN A WIRELESS LINK

(71) Applicant: IPR Licensing, Inc., Wilmington, DE (US)

(72) Inventors: Kevin L. Farley, Wake Forest, NC (US); James A. Proctor, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,718

(22) Filed: Oct. 30, 2015

(65) Prior Publication Data

US 2016/0050584 A1    Feb. 18, 2016

Related U.S. Application Data

(63) Continuation of application No. 13/108,481, filed on May 16, 2011, now Pat. No. 9,210,616, which is a
(Continued)

(51) Int. Cl.
*H04W 28/02* (2009.01)
*H04L 1/00* (2006.01)
(Continued)

(52) U.S. Cl.
CPC ....... *H04W 28/0268* (2013.01); *H04L 1/0015* (2013.01); *H04L 1/0017* (2013.01);
(Continued)

(58) Field of Classification Search
CPC .................. H04W 28/0268; H04L 1/0015
See application file for complete search history.

(56) References Cited

U.S. PATENT DOCUMENTS 4,451,702 A    5/1984 Brightman et al.
4,471,169 A    9/1984 Lenk et al.
(Continued)

OTHER PUBLICATIONS

US 5,699,349, 12/1997, Russ et al. (withdrawn)
(Continued)

*Primary Examiner* — Robert M Morlan
*Assistant Examiner* — Nourali Mansoury
(74) *Attorney, Agent, or Firm* — Volpe and Koenig, P.C.

(57) ABSTRACT

A packet data system such as a TCP/IP network transmits packets containing a variety of data types along links in the network. Packets are transmitted in a stream between nodes interconnected by the links connections, which conform to a transport layer protocol such as TCP, UDP, and RSTP, and include wireless links, which transmit packets using a radio frequency (RF) medium. By examining the data in a packet, performance characteristics such as a port number are determined. The performance characteristics indicate the application type, and therefore, the data type, of the packets carried on the connection. Since certain data types, such as streaming audio and video, are more loss tolerant, determination of the data type is used to compute link control parameters for the wireless link which that are optimal to the type of data being transmitted over the link.

10 Claims, 9 Drawing Sheets

Related U.S. Application Data continuation of application No. 11/193,587, filed on Jul. 29, 2005, now Pat. No. 7,944,845, which is a continuation of application No. 09/777,555, filed on Feb. 5, 2001, now Pat. No. 6,937,562.

(51) Int. Cl.

| | |
|---|---|
| *H04L 12/26* | (2006.01) |
| *H04W 28/18* | (2009.01) |
| *H04L 29/06* | (2006.01) |
| *H04L 1/18* | (2006.01) |
| *H04L 12/853* | (2013.01) |
| *H04L 12/851* | (2013.01) |
| *H04W 24/00* | (2009.01) |
| *H04W 28/06* | (2009.01) |
| *H04W 80/00* | (2009.01) |

(52) U.S. Cl.
CPC ............ *H04L 1/18* (2013.01); *H04L 12/2602* (2013.01); *H04L 43/00* (2013.01); *H04L 47/2416* (2013.01); *H04L 47/2441* (2013.01); *H04L 65/60* (2013.01); *H04L 65/80* (2013.01); *H04L 69/16* (2013.01); *H04L 69/165* (2013.01); *H04L 69/18* (2013.01); *H04W 28/18* (2013.01); *H04L 43/087* (2013.01); *H04L 43/0829* (2013.01); *H04L 43/0852* (2013.01); *H04W 24/00* (2013.01); *H04W 28/06* (2013.01); *H04W 80/00* (2013.01)

(56) References Cited

U.S. PATENT DOCUMENTS

| | | |
|---|---|---|
| 4,475,011 A | 10/1984 | Brightman et al. |
| 4,479,034 A | 10/1984 | Brightman et al. |
| 4,524,440 A | 6/1985 | Orsic |
| 4,555,595 A | 11/1985 | Brightman et al. |
| 4,734,907 A | 3/1988 | Turner |
| RE32,900 E | 4/1989 | Orsic |
| 4,829,227 A | 5/1989 | Turner |
| 4,872,157 A | 10/1989 | Hemmady et al. |
| 4,872,158 A | 10/1989 | Richards et al. |
| 4,872,159 A | 10/1989 | Hemmady et al. |
| 4,872,160 A | 10/1989 | Hemmady et al. |
| 4,875,206 A | 10/1989 | Nichols et al. |
| 4,893,302 A | 1/1990 | Hemmady et al. |
| 4,894,824 A | 1/1990 | Hemmady et al. |
| 4,896,319 A | 1/1990 | Lidinsky et al. |
| 4,897,874 A | 1/1990 | Lidinsky et al. |
| 4,899,333 A | 2/1990 | Roediger |
| 4,922,486 A | 5/1990 | Lidinsky et al. |
| 4,942,574 A | 7/1990 | Zelle |
| 4,958,341 A | 9/1990 | Hemmady et al. |
| 4,977,582 A | 12/1990 | Nichols et al. |
| 5,088,091 A | 2/1992 | Schroeder et al. |
| 5,138,615 A | 8/1992 | Lamport et al. |
| 5,166,929 A | 11/1992 | Lo |
| 5,274,634 A | 12/1993 | Babiarz |
| 5,377,192 A | 12/1994 | Goodings et al. |
| 5,506,847 A | 4/1996 | Shobatake |
| 5,768,561 A | 6/1998 | Wise |
| 5,778,316 A | 7/1998 | Persson et al. |
| 5,781,535 A | 7/1998 | Russ et al. |
| 5,848,244 A | 12/1998 | Wilson |
| 5,867,494 A | 2/1999 | Krishnaswamy et al. |
| 5,867,495 A | 2/1999 | Elliott et al. |
| 5,903,834 A | 5/1999 | Wallstedt et al. |
| 5,913,164 A | 6/1999 | Pawa et al. |
| 5,918,017 A | 6/1999 | Attanasio et al. |
| 5,959,968 A | 9/1999 | Chin et al. |
| 5,963,554 A | 10/1999 | Song |
| 5,990,806 A | 11/1999 | Mock et al. |
| 5,999,525 A | 12/1999 | Krishnaswamy et al. |
| 6,023,724 A | 2/2000 | Bhatia et al. |
| 6,028,848 A | 2/2000 | Bhatia et al. |
| 6,029,203 A | 2/2000 | Bhatia et al. |
| 6,031,832 A | 2/2000 | Turina |
| 6,044,080 A | 3/2000 | Antonov |
| 6,052,803 A | 4/2000 | Bhatia et al. |
| 6,091,737 A | 7/2000 | Hong et al. |
| 6,094,659 A | 7/2000 | Bhatia et al. |
| 6,094,683 A | 7/2000 | Drotter et al. |
| 6,101,541 A | 8/2000 | Ellesson et al. |
| 6,108,330 A | 8/2000 | Bhatia et al. |
| 6,115,393 A | 9/2000 | Engel et al. |
| 6,118,768 A | 9/2000 | Bhatia et al. |
| 6,119,167 A | 9/2000 | Boyle et al. |
| 6,151,332 A | 11/2000 | Gorusch et al. |
| 6,161,008 A | 12/2000 | Lee et al. |
| 6,163,532 A | 12/2000 | Taguchi et al. |
| 6,163,543 A | 12/2000 | Chin et al. |
| 6,167,445 A | 12/2000 | Gai et al. |
| 6,169,759 B1 | 1/2001 | Kanterakis et al. |
| 6,185,598 B1 | 2/2001 | Farber et al. |
| 6,219,337 B1 | 4/2001 | Miyao |
| 6,226,279 B1 | 5/2001 | Hansson et al. |
| 6,236,646 B1 | 5/2001 | Beming et al. |
| RE37,301 E | 7/2001 | Lo |
| 6,301,286 B1 | 10/2001 | Kanterakis et al. |
| 6,388,999 B1 | 5/2002 | Gorsuch et al. |
| 6,512,931 B1 | 1/2003 | Kim et al. |
| 6,542,481 B2 | 4/2003 | Foore et al. |
| 6,560,239 B1 | 5/2003 | Frid et al. |
| 6,580,704 B1 | 6/2003 | Wellig et al. |
| 6,597,662 B1 | 7/2003 | Kumar et al. |
| 6,611,514 B1 | 8/2003 | Moulsley |
| 6,621,807 B1 | 9/2003 | Jung et al. |
| 6,625,158 B1 | 9/2003 | Alexander, Jr. et al. |
| 6,628,945 B1 | 9/2003 | Koorapaty et al. |
| 6,674,739 B1 | 1/2004 | Lee et al. |
| 6,738,352 B1 | 5/2004 | Yamada et al. |
| 6,757,263 B1 | 6/2004 | Olds |
| 6,785,227 B1 | 8/2004 | Lu et al. |
| 6,845,089 B1 | 1/2005 | Gu et al. |
| 7,046,717 B2 | 5/2006 | Kanterakis et al. |
| 7,079,507 B2 | 7/2006 | Toskala et al. |
| 7,099,629 B1 | 8/2006 | Bender |
| 7,120,123 B1 | 10/2006 | Quigley et al. |
| 7,158,504 B2 | 1/2007 | Kadaba et al. |
| 7,266,107 B2 | 9/2007 | Choi et al. |
| 7,340,256 B2 | 3/2008 | Speight |
| 7,492,720 B2 | 2/2009 | Pruthi et al. |
| 2002/0093930 A1 | 7/2002 | Dertz et al. |
| 2004/0077349 A1 | 4/2004 | Barak et al. |
| 2004/0136400 A1 | 7/2004 | Majidi-Ahy et al. |
| 2004/0248583 A1 | 12/2004 | Satt et al. |
| 2007/0005795 A1 | 1/2007 | Gonzalez |

OTHER PUBLICATIONS

Reynolds et al., "Assigned Numbers," Network Working Group, Request for Comments: 1700, IETF (Oct. 1994).

Third Generation Partnership Project 2, "Technical Specification Group Radio Interface; Administration of Parameter Value Assignments for cdma2000 Spread Spectrum Standards (Release A)," 3GPP2 C.R1001-A V2.0 (Jul. 2000).

Third Generation Partnership Project 2, "Technical Specification Group Radio Interface; cdma2000 High Rate Packet Data Air Interface Specification," 3GPP2 C.S0024-0 V2.0(Oct. 2000).

Third Generation Partnership Project, "Technical Specification Group Radio Access Network; MAC protocol specification (Release 1999)," 3GPP TS 25.321 V3.6.0 (Dec. 2000).

Third Generation Partnership Project, "Technical Specification Group Services and System Aspects; QoS Concept and Architecture (Release 1999)," 3GPP TS 23.107 V3.5.0 (Dec. 2000).

Third Generation Partnership Project, "Technical Specification Group Services and System Aspects; End-to-End QoS Concept and Architecture," 3GPP TS 23.207 V1.0.0 (Nov. 2000).

(56) References Cited

OTHER PUBLICATIONS

Third Generation Partnership Project, "Technical Specification Group Radio Access Network; Radio Interface Protocol Architecture (Release 1999)," 3GPP TS 25.301 V3.6.0 (Sep. 2000).

Telecommunications Industry Association, "TIA/EIA Standard, Mobile Station-Base Station Compatibility Standard for Wideband Spread Spectrum Cellular Systems," TIA/EIA-95-B (Upgrade and Revision of TIA/EIA-95-A), (Mar. 1999).

Third Generation Partnership Project 2 "3GPP2," "Medium Access Control (MAC) Standard for cdma2000 Spread Spectrum Systems," Release A, 3GPP2 C.S0003-A (Jun. 9, 2000).

Third Generation Partnership Project 2 "3GPP2," "Physical Layer Standard for cdma2000 Spread Spectrum Systems," Release A, Addendum 1, 3GPP2 C.S0002-A-1, Version 1.0 (Sep. 12, 2000).

ANSI/IEEE Std 802.1D, 1998 Edition, IEEE Standard for Information technology—Telecommunications and information exchange between systems—Local and metropolitan area networks—Common specifications, Part 3: Media Access control (MAC) Bridges, (Jun. 25, 1998).

ANSI/IEEE Std 802.11, 1999 Edition, Information technology—Telecommunications and information exchange between systems—Local and metropolitan area networks—Specific requirements—Part 11: Wireless LAN Medium Access Control (MAC) and Physical Layer (PHY) Specifications, (Mar. 18, 1999).

IEEE Std 802.11a-1999 (Supplement to IEEE Std 802.11-1999), Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications High-speed Physical Layer in the 5 GHz Band, (Sep. 16, 1999).

IEEE Std 802.11b-1999 (Supplement to IEEE Std 802.11-1999), Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, (Sep. 16, 1999).

Third Generation Partnership Project, "Technical Specification Group Radio Access Networks; UE Radio Transmission and Reception (FDD) (Release 1999)," 3GPP TS 25.101 V3.5.0 (Dec. 2000).

| FLOW MODEL IDX | PROTOCOL ID | WELL-KNOWN PORT NUMBER | RTP PAYLOAD TYPE | APPLICATION ID | TRANS. MODEL IDX |
|---|---|---|---|---|---|
| F1 | tcp | 80 | nil | www | t10 |
| F2 | udp | 69 | nil | tftp | t20 |
| F3 | udp | 7070 | audio | realaudio | t30 |
| ... | | | | | |
| Fn | | | | | |

FIG. 3

| TRANS. MODEL ID | MODULATION TYPE | ARQ DISABLE | CODING RATE | MIN. SUGG. BW | AVG. SUGG. BW | MAX. SUGG. BW | DELAY | JITTER |
|---|---|---|---|---|---|---|---|---|
| t10 | | N | | | | | | |
| t20 | | N | | 48k | 64k | 80k | | |
| t30 | | Y | | 28k | 32k | 40k | | |
| ... | | | | | | | | |
| tn | | | | | | | | |

FIG. 4

APPLICATION SPECIFIC TRAFFIC OPTIMIZATION IN A WIRELESS LINK

CROSS REFERENCE TO RELATED APPLICATIONS

This application is a continuation of U.S. patent application Ser. No. 13/108,481 filed on May 16, 2011, which is a continuation of U.S. patent application Ser. No. 11/193,587 filed on Jul. 29, 2005, which issued as U.S. Pat. No. 7,944,845 on May 17, 2011, which is a continuation of U.S. patent application Ser. No. 09/777,555 filed on Feb. 5, 2001, which issued as U.S. Pat. No. 6,937,562 on Aug. 30, 2005, the contents of which are hereby incorporated by reference herein.

BACKGROUND

In a typical data communication system, packets containing a variety of data types are transmitted between different nodes of a network, typically in a client-server manner. The packets are transmitted in a stream from a source node to a destination node. The nodes are interconnected via physical connections that conform to a link layer protocol such as HDLC, ATM, and frame relay, for example. These connections may include wireless links, which transmit packets using a radio frequency (RF) medium.

The transport layer, however, is typically indifferent to the link layer protocols and whether the link layer is a wireless or wired link. However, wired and wireless links usually exhibit different performance characteristics. For example, wireless links typically exhibit higher error rates, longer latency times, and limited throughput depending on the number of users supported. Many transport layer protocols, however, were developed according to wired link performance expectations, and do not lend themselves to efficient implementation over wireless links. Therefore, connections that include a wireless link may suffer from performance degradation since the transport layer protocols, such as TCP, UDP, and RSTP, are not sensitive to specific performance and behavior characteristics of wireless links.

The transport layer protocols are implemented to prevent inaccuracies in the data such as packet loss and transmission errors in the packet. However, certain applications employ data types that are more loss-tolerant and do not need to assure absolute accuracy in the received data stream. For example, data types such as streaming audio and video can tolerate lost packets and bit errors without substantially compromising the output perceived by a user. On the other hand, data types such as an executable file would likely result in unpredictable results if even one bit is inaccurately received.

It would be beneficial, therefore, to provide a system and method to determine the application and performance metrics corresponding to a connection, and modify related link control parameters of the wireless link according to a corresponding flow model. The link control parameters may adjust the physical layer characteristics, such as bandwidth, coding levels, and the like, to tolerate packet loss when appropriate. This increases the overall perceived throughput over the wireless link.

SUMMARY

In an embodiment, a transmitting device is disclosed. The transmitting device may include: a processor configured to provide a plurality of packets flows; the processor is further configured to associate control parameters with the packet flows; wherein the control parameters for each packet flow include a type of the packet flow and retransmission characteristics of the packet flow; the processor is further configured to multiplex data of packets of the plurality of packet flows based on priority values associated with the data of packet flows; wherein data of the packet flows is retransmitted based on the retransmission characteristics of the packet flows; and a transmitter configured to transmit the multiplexed data.

In an embodiment, a method is disclosed. The method may include: providing, by a transmitting device, a plurality of packets flows; associating, by the transmitting device, control parameters with the packet flows; wherein the control parameters for each packet flow include a type of the packet flow and a retransmission characteristic of the packet flow; multiplexing, by the transmitting device, data of packets of the plurality of packet flows based on priority values associated with the data of packet flows; wherein data of the packet flows is retransmitted based on the retransmission characteristics of the packet flows; and transmitting, by the transmitting device, the multiplexed data.

BRIEF DESCRIPTION OF THE DRAWINGS

A more detailed understanding may be had from the following description, given by way of example in conjunction with the accompanying drawings wherein:

FIG. 3 shows the flow model table;

FIG. 4 shows the transfer model table;

DETAILED DESCRIPTION

A description of preferred embodiments of the invention follows.

Figure 1:
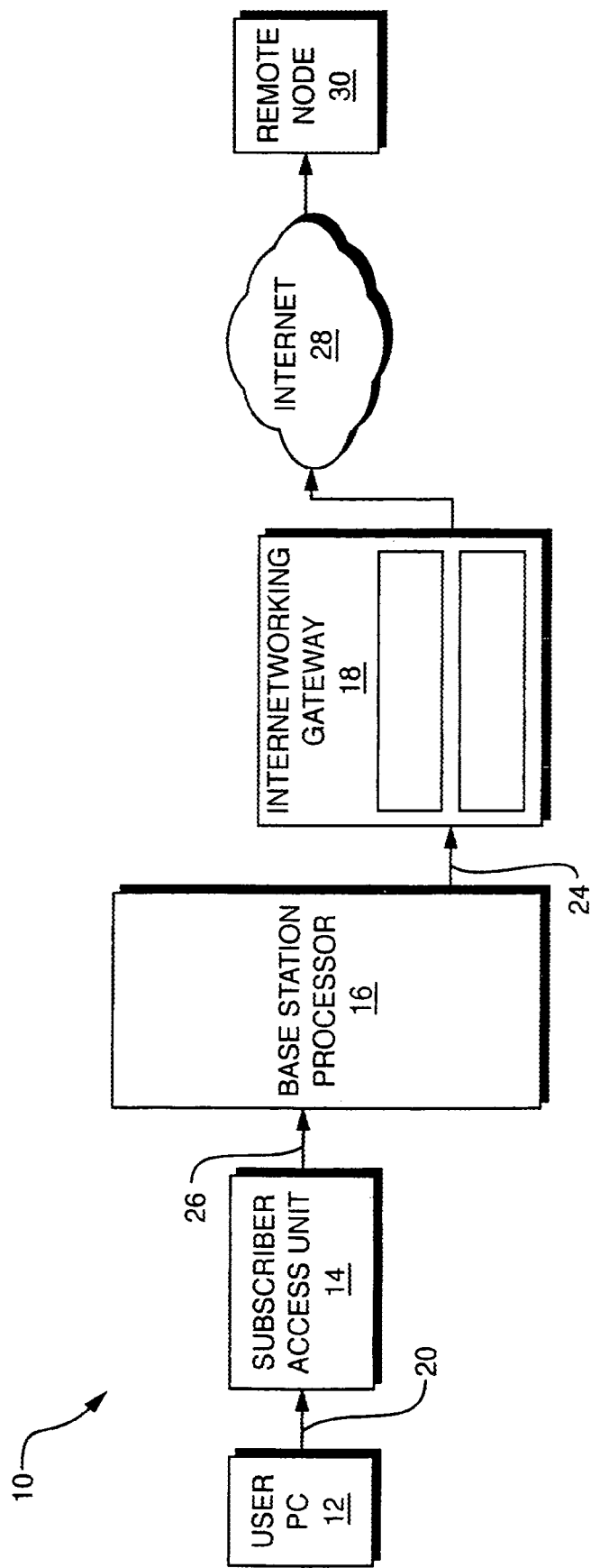
FIG. 1 is a wireless communication system suitable for performing application specific traffic optimization.

Referring to FIG. 1, in a computer network, such as a network using the TCP/IP protocol, a logical connection is maintained between a local node or user 12 and a remote node 30. The user node 12 may, for example be a personal computer (PC) and the remote node 30 may be a file server such as a web server. Data is carried between the user 12 and the remote node 30 by transmitting data in formatted packets, which flow in a stream over the connection. The connection includes both wired links 20, 24 and a wireless link 26. The wireless link 26 is maintained by a base station processor 16 and a subscriber access unit 14, which is in turn connected to the user 12. The base station processor 16 connects to a public access network such as the Internet 28 via an internetworking gateway 18 over the wired link 24. A user 12 can therefore maintain wireless connectivity to a remote node 30 via the wireless link 26 provided by the base station processor 16 and the subscriber access unit 14. The connection between the remote node 30 and the user 12 conforms to a protocol, such as TCP/IP. As described above, TCP/IP was developed for wired networks, and, accordingly, does not lend itself directly to efficient transmissions over the wireless link 26.

Figure 2:
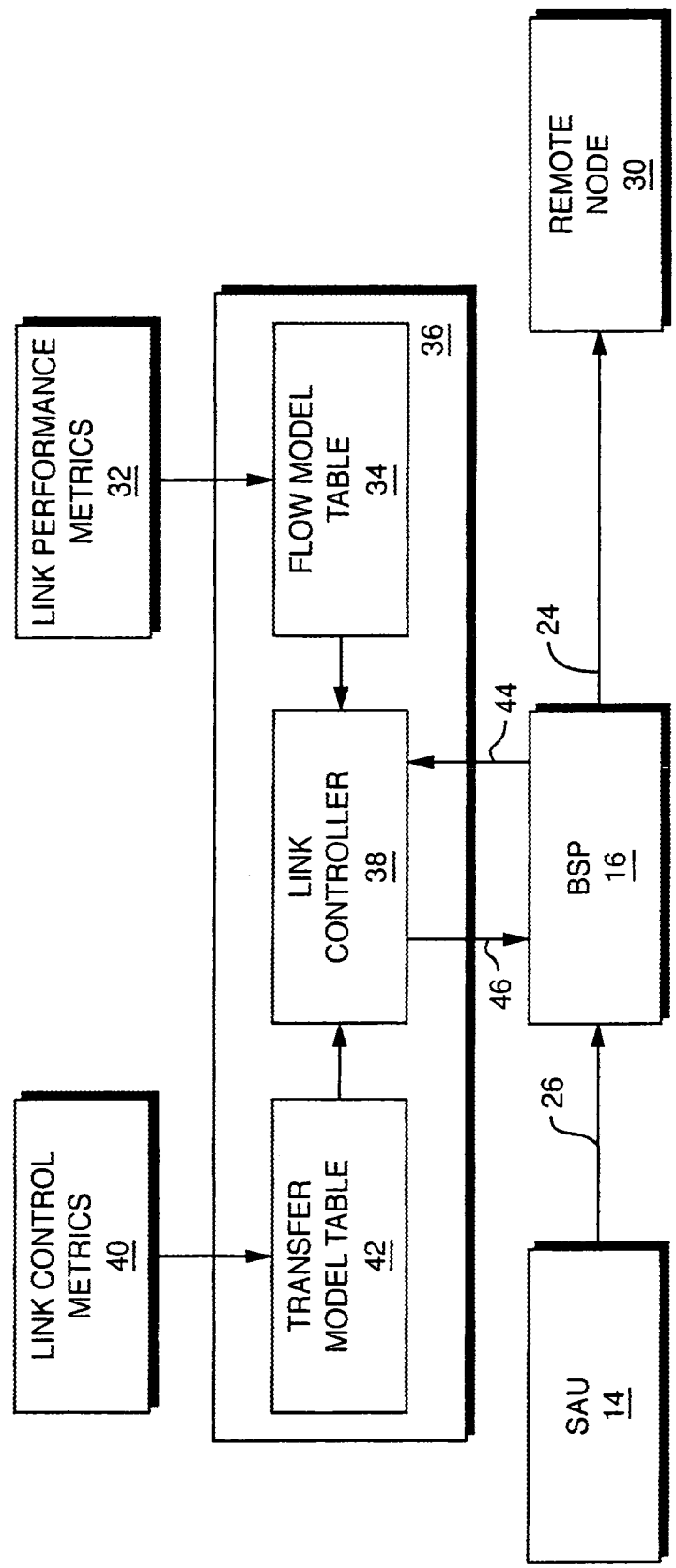
FIG. 2 is a block diagram of the traffic optimization system.

Referring to FIG. 2, a block diagram of the present invention is shown. The base station processor 16 maintains a table of link performance metrics 32 and link control metrics 40. A link analyzer 36 includes a link controller 38, a flow model table 34, and a transfer model table 42. The set of link performance metrics 32 is defined to enumerate link performance characteristics 44 that can be monitored.

The flow model table 34 is defined to specify link performance metrics 32 included in a particular flow model stored in the flow model table 34. The link controller 38 is operable to analyze link performance characteristics 44 in the packets sent from the remote node 30 over the wired link 24. The link performance characteristics 44 are analyzed by comparison with flow model entries in the flow model table 34. The transfer model table 42 is defined from the link control metrics 40, and stores transfer model entries including one or more link control parameters 46 corresponding to a particular flow model entry in the flow model table 34.

The analysis of the link performance characteristics 44, described further below, determines a flow model 34 indicative of the stream of packets being transmitted over the link. The link controller 38 computes a corresponding transfer model entry by mapping into the transfer model table 42. The corresponding transfer model entry in the transfer model table 42 defines one or more link control parameters 46 of the transfer model entry. The link controller 38 then applies the link control parameters 46 to the wireless link 26 via the base station processor 16.

Referring to FIG. 3, the flow model table 34 is shown having flow model entries 34a, 34b, and 34c. As described above, each flow model entry 34n defines link performance metrics 32 corresponding to the data type of a particular stream of packets. In one embodiment, a packet based network associates ports with applications. By examining the port associated with a transmitted packet, the application type can be determined. For example, in a TCP/IP network, certain well known port numbers 48 are predetermined and identified by RFC 1700 promulgated by the Internet Engineering Task Force (IETF). The flow model entry 34n corresponding to the well-known port number 48 determines the application type 50. The application type 50 is indicative of the loss tolerance of the stream. For example, flow model entry 34c indicates a streaming audio data type. Streaming audio is generally thought to be more loss-tolerant because lost or erroneous packets would merely be heard as a slight pop or glitch in the output audio signal heard by the user. On the other hand, flow model entry 34b corresponds to a file transfer, and accordingly, is not tolerant to lost or erroneous packets. The use of the port number as a link performance characteristic as defined herein is exemplary. Other performance characteristics, such as those defined in the flow model table 34 and others, could be employed in computing the transfer model.

The flow model is employed to compute a transfer model directed towards optimizing the packet traffic flow on a particular connection. Referring to FIGS. 2, 3, and 4, each flow model entry 34n includes a transfer model index 52. A transfer model entry 54n is computed by mapping the transfer model index 52 into the transfer model table 42 to determine the corresponding transfer model entry 54n. The corresponding transfer model entry 54n includes link control metrics 40 operable to modify the connection. The link control parameters 46 of the corresponding transfer model entry are applied to the connection. In alternative embodiments, additional computations could be performed to compute the link control parameters.

Figure 5A:
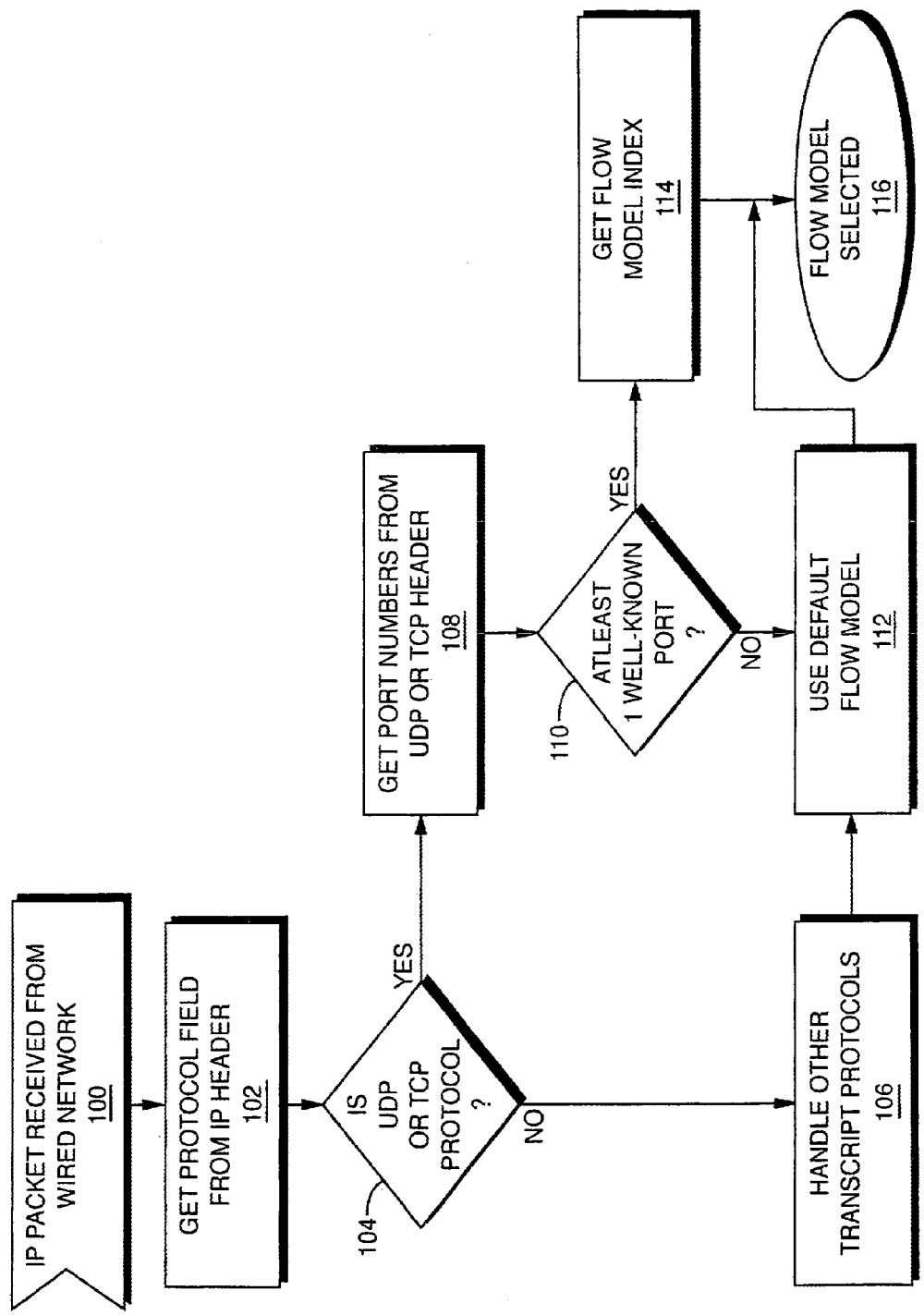
FIGS. 5a-5c show a flowchart of application specific traffic optimization.
Figure 5B:
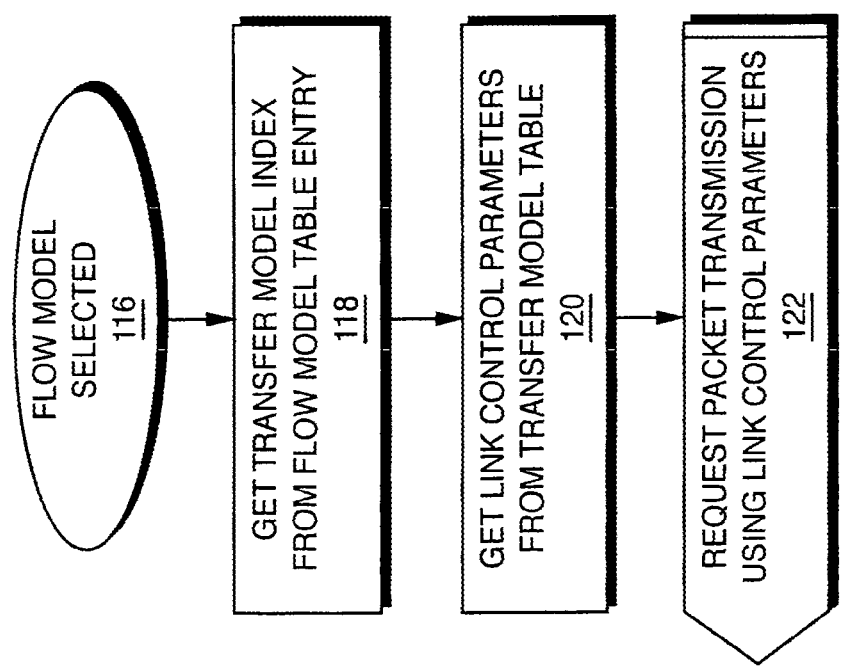

FIGS. 5a-5b illustrate a flowchart of a particular embodiment of message flow, as defined herein, which invokes an IP port number as a link performance characteristic. An IP packet is received from the wired network, as depicted at step 100. The protocol field is read from the IP header in the packet, as shown at step 102. It should be noted, however, that other discriminating characteristics of the packets may be examined to construct message flows. In a particular embodiment, the protocol field is examined to determine if the protocol is TCP or UDP, as disclosed at step 104. If the protocol is not TCP or UDP, then an alternate protocol is handled, as depicted at step 106, and control continues as described below at step 112.

If the protocol is TCP or UDP, the port numbers are then read from the header, as shown at step 108. A typical header has both a source and a destination port. Either port may be indicative of an application and hence, a data type. A check is made to determine if there is at least one well-known port, as disclosed at step 110. If there is not a well-known port, then the default flow model is allowed to persist, as shown at step 112. Referring back to FIG. 3, if there is a well-known port, the flow model index 55 corresponding to the port is determined, as disclosed at step 114, and the corresponding flow model entry 34n is determined, as disclosed at step 116. The check may include parsing the flow model table to find a matching well-known port number 48, and may include other operations directed towards determining a particular flow model entry 34n.

Referring to FIGS. 3, 4, and 5b, the selected flow model 34n is read to determine the corresponding transfer model index 52, as depicted at step 118. The transfer model index 52 is invoked to determine a transfer model entry 54n in the flow model table 42, and the corresponding link control parameters 46 are retrieved, as shown at step 120. Other computations may also be employed to determine link control parameters, in addition to the transfer model table 42 lookup described above. Packet transmission employing the link control parameters 46 is requested, as disclosed at step 122, by applying the link control parameters 46 to the connection.

Figure 5C:
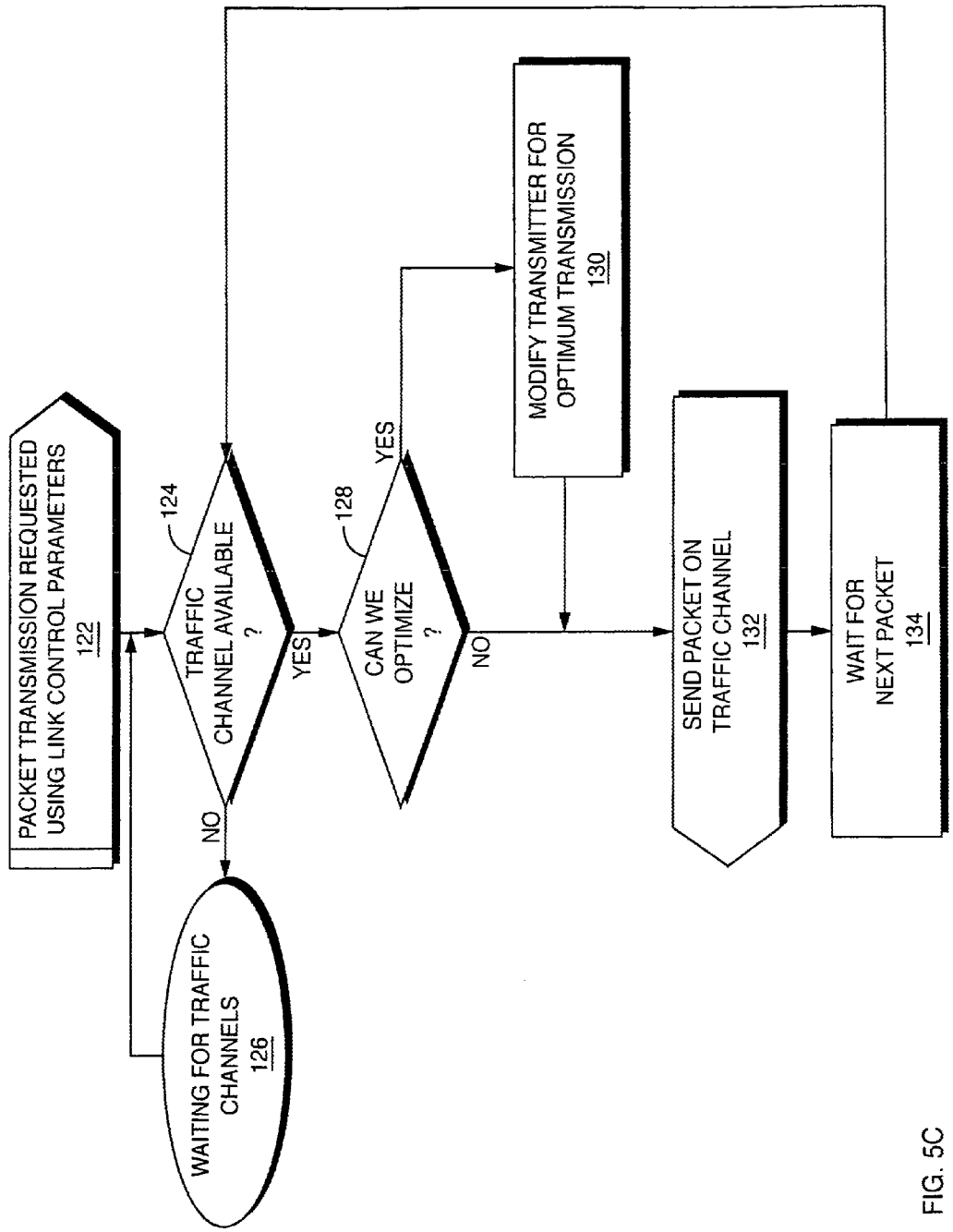

Referring to FIG. 5c, a check is made to determine if a wireless traffic channel is available, as shown at step 124. If a wireless traffic channel is not available, a wait is performed until a traffic channel becomes available, as depicted at step 126. When a traffic channel is available, a check is performed to see if the link control parameters can be applied at this time for this packet as shown in step 128. If the check is successful, the transmitter of the wireless signal is optimized according to the link control parameters established for the connection, as depicted at step 130. The packet is then sent on the packet traffic channel, as depicted at step 132, and a wait is performed for the next packet to be received as depicted at step 134. Control then reverts to step 100 above as new IP packets are received from the network.

Figure 6:
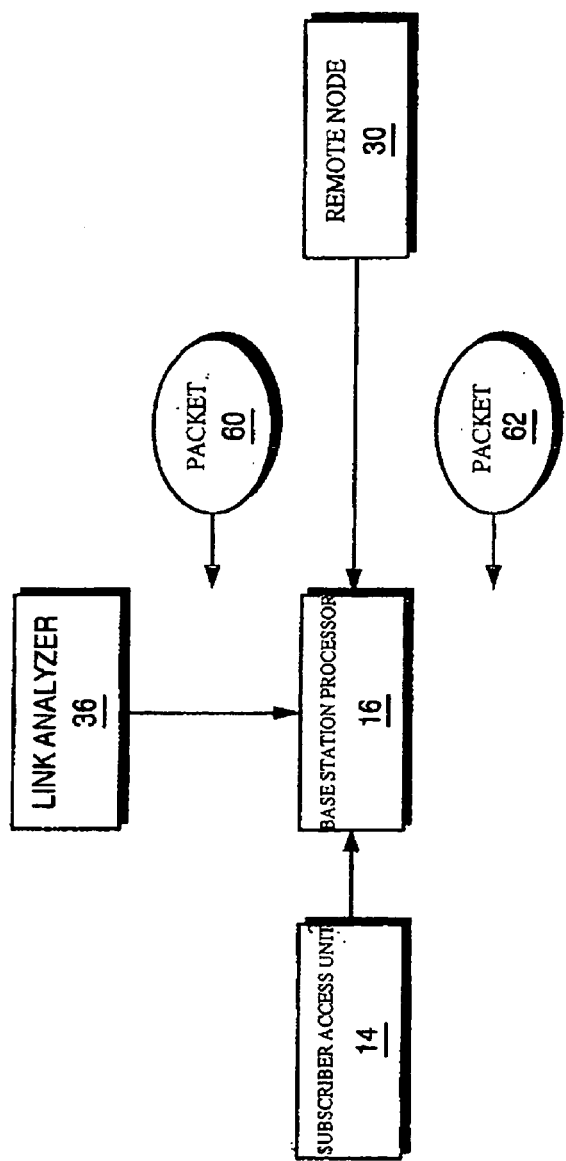
FIG. 6 shows an example of application specific traffic optimization.

Referring to FIGS. 3, 4, and 6, an example of optimal packet flow parameters as defined by the present claims is shown. A packet flow including packet 60 has a port number value of 7070. Accordingly, the flow model index 55 is determined to be F3 stored in flow model table 34 entry 34c. The transfer model index 52 corresponding to entry 34c is T30. Indexing into the transfer model table 42 with transfer model index T30 yields transfer model entry 54c. The corresponding link control parameters for transfer model entry 54c include ARQ (automatic repeat request) disable 72 value of Y (yes), minimum suggested bandwidth 74 of 28 k, average suggested bandwidth 76 of 32 k, and maximum suggested bandwidth 78 of 40 k. Since the application ID 50 is realaudio, we know that this is a streaming audio connection and therefore is loss tolerant. Accordingly, the ARQ disable may be set to Y because we need not retransmit a lost packet for the reasons described above. Similarly, the suggested bandwidth fields 74, 76, and 78 are set to the values corresponding to that application type.

On the other hand, the message packet 62 is analyzed to have a port number of 69. Determining the flow model index 55 results in a value of F2. Indexing into the flow model table 34 using index 55 of F2 yields flow model entry 34b, corresponding to transfer model index T20. Computing the corresponding transfer model entry 54n in the transfer model table 42 indicates that entry 54b corresponds to T20. The corresponding link control parameters 46 for entry 54b include ARQ disable value of N (no), minimum suggested bandwidth of 48 k, average suggested bandwidth of 64 k, and maximum suggested bandwidth of 80 k. Since flow model entry 34b indicates a data type of trivial file transfer protocol (tftp), error-free transmission is suggested. Accordingly, the ARQ flag should not be disabled, and the suggested bandwidths are relatively larger, as shown in entry 54b, as is determined to be most efficient for the corresponding application type.

As indicated above, the foregoing example illustrates the use of a port number as a link performance characteristic and the ARQ flag and suggested bandwidth ranges as a link control parameter. In alternate embodiments other variables may also be employed without departing from the invention as claimed below. In particular, the application specific data derivable from a data packet is employed in computing a loss tolerance of the type of data on the connection, and modifying the connection to specific, optimal values for the particular data type. For example, the delay 80 link control parameter is used to specify a maximum delay which may occur between transmissions to avoid starving the user with real-time information, such as audio and video. Similarly, jitter 82 refers to the maximum variance between transmissions which should be permitted which still allows the user to maintain the incoming stream.

Figure 7:
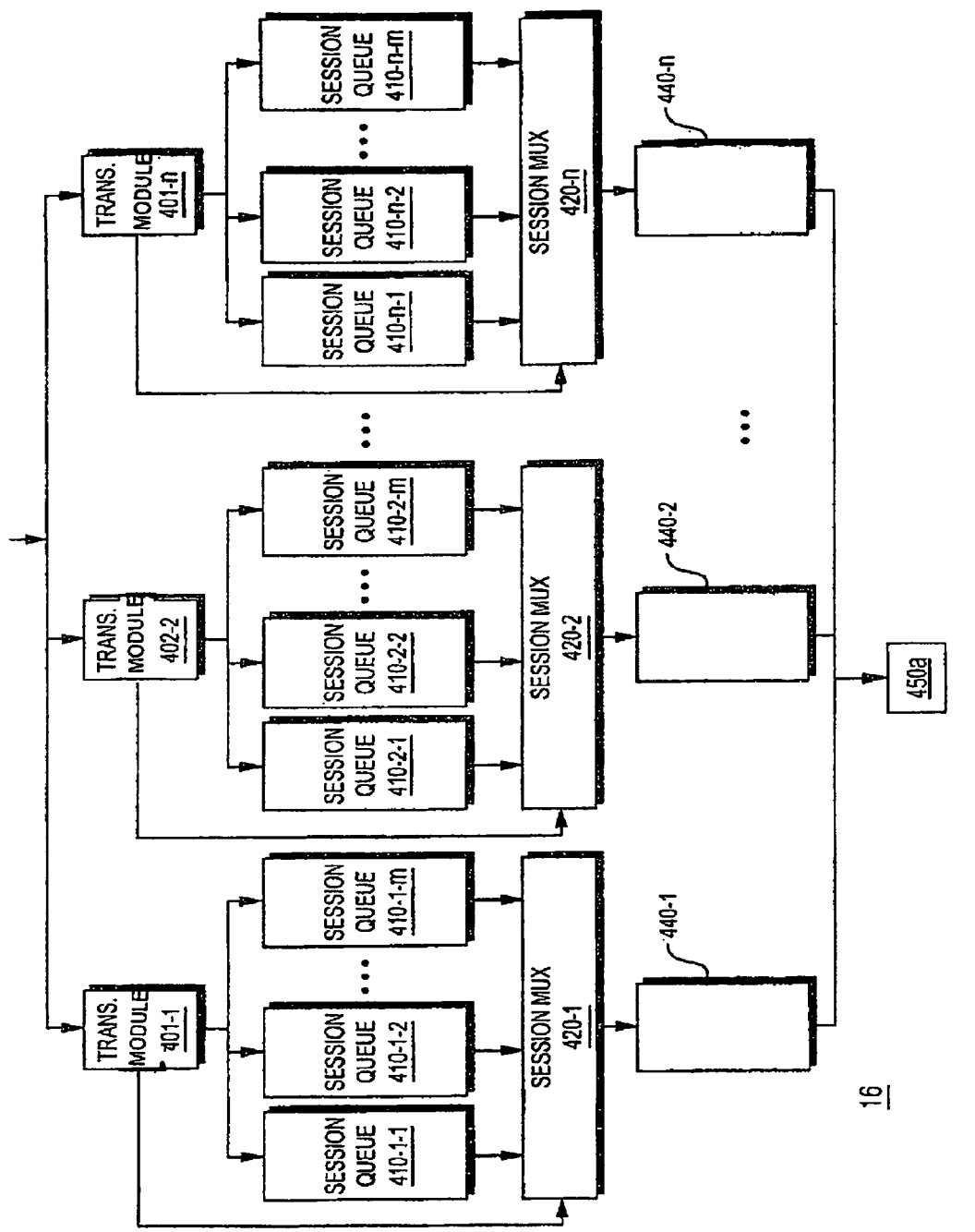
FIG. 7 shows a diagram of a particular architecture in a base station processor adapted for application specific traffic optimization as described herein.

FIG. 7 shows a particular embodiment of base station processor 16 architecture for implementing application specific traffic optimization. This architecture is operable for wireless channel allocation and message transmission as described in co-pending U.S. patent application entitled "Dynamic Bandwidth Allocation for Multiple Access Communication Using Session Queues," which is a continuation-in-part of a prior U.S. patent application Ser. No. 09/088,527, filed Jun. 1, 1998, entitled "Dynamic Bandwidth Allocation for Multiple Access Communications Using Buffer Urgency Factor." The entire teachings of the above applications are incorporated herein by reference.

Referring to FIG. 7, at the base station 16, incoming traffic is separated into individual traffic flows destined for separate subscriber access units 14 generally (FIG. 1). The traffic flows may be separated by various means, such as by examining a destination address field in the TCP/IP header. The individual traffic flows are delivered first to transport modules 401-1, 401-2, . . . , 401-n with a transport module 401 corresponding to each of the intended subscriber units 14. A given transport module 401 is the first step in a chain of processing steps that is performed on the data intended for each subscriber unit 14. This processing chain includes not only the functionality implemented by the transport module 401 but also a number of session queues 410, a session multiplexer 420, and transmission buffers 440. The outputs of the various transmission buffers 440-1, 440-2, . . . , 440-n are then assembled by a transmit processor 450 that formats the data for transmission over the forward radio links 110.

Returning attention now to the top of the FIG. 7 again, each transport module 401 has the responsibility of either monitoring the traffic flow in such a way that it stores data belonging to different transport layer sessions in specific ones of the session queues 410 associated with that transport module 401. For example, transport module 401-1 assigned to handle data intended to be routed to subscriber unit 101-1 has associated with it a number, m, of session queues 410-1-1,410-1-2, . . . , 410-1-m. In the preferred embodiment, a given session may be characterized by a particular transport protocol in use. For example, in a session oriented transport protocol, a session queue 410 is assigned to each session. Such session transport oriented protocols include, for example, Transmission Control Protocol. In sessionless transport protocols, a session queue 410 is preferably assigned to each stream. Such sessionless protocols may for example be the Universal Datagram Protocol (UDP). Thus traffic destined for a particular subscriber unit 14 is not simply routed to the subscriber unit 14. First, traffic of different types from the perspective of the transport layer are first routed to individual session queues 410-1-1, 410-1-2, . . . , 410-1-m, associated with that particular connection. In accordance with the system as defined above, traffic indicating a new connection is analyzed to determine link performance characteristics 44 for the messages received on that connection. The link performance characteristics 44 are analyzed to determine a flow model index 55, as described above with respect to FIG. 3. The flow model is then used to compute a transfer model entry 54 as described above with respect to FIG. 4. The transport module 401 invokes the link performance characteristics 46 corresponding to the computed transfer model entry 54, and applies them to the session queue 410-n-m for this connection.

Another key function performed by the transport module 401-1 is to assign priorities to the individual queues 410-1 associated with it. It will later be understood that depending upon the bandwidth available to a particular subscriber unit 14, traffic of higher priority will be delivered to the transmission buffer 440-1 before those of lower priority, as determined by the transfer model and the associated link control parameters 46 in the transfer model table 42. This may include traffic that is not session oriented, for example, real time traffic or streaming protocols that may be carrying voice and/or video information. More particularly, the transport module 401-1 reports the priorities of each of the individual session queues 410-1 to its associated session multiplexer 420. Traffic of higher priority will be selected by the session multiplexer 420 for loading into the transmit buffer 440-1 for loading traffic of lower priority, in general as determined by the link control parameters 46 from the entries 54 in the transfer model table 42.

Those skilled in the art should readily appreciate that the programs defining the operations and methods defined herein are deliverable to a subscriber access unit and to a base station processor in many forms, including but not limited to: (a) information permanently stored on non-writeable storage media such as ROM devices; (b) information alterably stored on writeable storage media such as floppy disks, magnetic tapes, CDs, RAM devices, and other magnetic and optical media; or (c) information conveyed to a computer through communication media, for example, using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for application specific traffic optimization have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A transmitting device comprising:
    a processor configured to provide a plurality of packet flows;
    the processor is further configured to associate control parameters with the plurality of packet flows; wherein the control parameters include a type of a packet flow and a retransmission characteristic of the packet flow;
    the processor is further configured to multiplex data of packets of the plurality of packet flows based on priority values associated with the packets; and
    a transmitter configured to transmit the multiplexed data; wherein at least a portion of the multiplexed data is retransmitted based on the retransmission characteristic of the packet flow.

2. The transmitting device of claim 1, wherein the retransmission characteristic comprises whether ARQ retransmission is disabled.

3. The transmitting device of claim 1, wherein a type of the packet flow comprises streaming data.

4. The transmitting device of claim 1, wherein the control parameters comprise an average data rate.

5. The transmitting device of claim 1, wherein the transmitting device is a component of a base station.

6. A method comprising:
    providing, by a transmitting device, a plurality of packet flows;
    associating, by the transmitting device, control parameters with the plurality of packet flows; wherein the control parameters include a type of the packet flow and a retransmission characteristic of a packet flow;
    multiplexing, by the transmitting device, data of packets of the plurality of packet flows based on priority values associated with the packets; and
    transmitting, by the transmitting device, the multiplexed data; wherein at least a portion of the multiplexed data is retransmitted based on the retransmission characteristic of the packet flow.

7. The method of claim 6, wherein the retransmission characteristic is whether ARQ retransmission is disabled.

8. The method of claim 6, wherein a type of the packet flow comprises streaming data.

9. The method of claim 6, wherein the control parameters comprise an average data rate.

10. The method of claim 6, wherein the transmitting device is a component of a base station.

* * * * *